United States Patent [19]
Mozer et al.

[11] Patent Number: 5,973,275
[45] Date of Patent: Oct. 26, 1999

[54] ELECTRIC SWITCH WITH MICROSWITCHES FITTED IN THE REGION OF THE MANUALLY OPERATED ACTUATING COMPONENT

[75] Inventors: Reiner Mozer, Vaihingen; Rudolf Klein; Walter Neubauer, both of Lauffen, all of Germany

[73] Assignee: ITT Manufacturing Enterprises, Inc., Wilmington, Del.

[21] Appl. No.: 09/011,362

[22] PCT Filed: Jun. 25, 1996

[86] PCT No.: PCT/EP96/02771

§ 371 Date: Apr. 7, 1998

§ 102(e) Date: Apr. 7, 1998

[87] PCT Pub. No.: WO97/06034

PCT Pub. Date: Feb. 20, 1997

[30] Foreign Application Priority Data

Aug. 4, 1995 [DE] Germany ............ 195 28 641

[51] Int. Cl.[6] ................................ H01H 9/00
[52] U.S. Cl. ...................... 200/61.54; 200/61.28
[58] Field of Search .............. 200/61.28, 61.35, 200/61.44, 332.1, 332.2

[56] References Cited

U.S. PATENT DOCUMENTS 3,934,101 1/1976 Jones ................... 200/5 B
4,640,997 2/1987 Lane, Jr. .
5,003,132 3/1991 Lagier ..................... 200/4

FOREIGN PATENT DOCUMENTS

| 25 31 696 | 2/1977 | Germany . |
| 2531696 | 2/1977 | Germany . |
| 28 35 256 | 2/1980 | Germany . |
| 2835256 | 2/1980 | Germany . |
| 2238363 | 6/1981 | Germany . |
| 2322661 | 11/1987 | Germany . |

Primary Examiner—Michael L. Gellner
Assistant Examiner—Nhung Nguyen
Attorney, Agent, or Firm—J. Gordon Lewis

[57] ABSTRACT

The invention relates to a steering column switch which should, with a uniform construction, be easily adaptable to different switching tasks. The invention is operated, in an optional manner, by means of microswitches which can be inserted into a mounting cavity of a carrier unit (2), whereby the cavity is positioned in the area of the grip handle (1) of the steering column switch. Advantageous further developments describe additional possibilities for the activation, independently of the rotational movement of the grip handle (1), of additional microswitches (16, 22) by means of an activation knob (23) in the activating element (1), or by means of the longitudinal movement of the grip handle (1) of displaceable contact parts (15, 22).

15 Claims, 1 Drawing Sheet

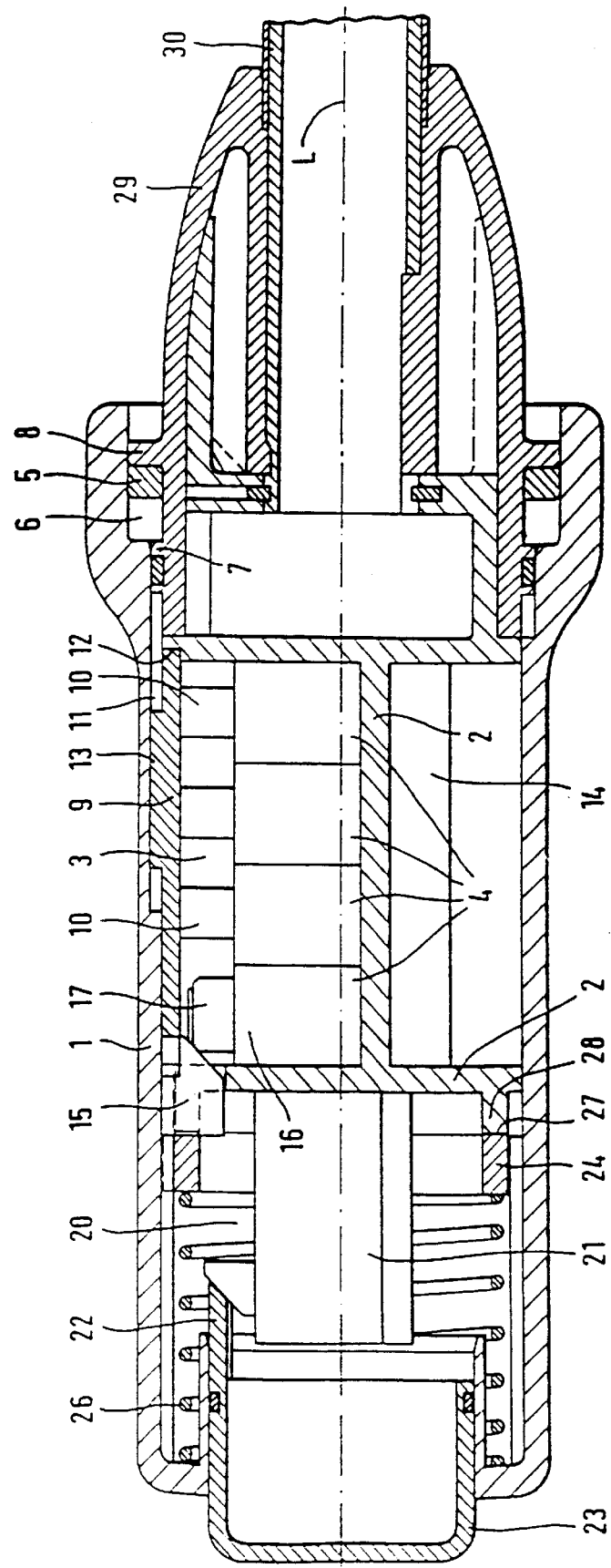

ELECTRIC SWITCH WITH MICROSWITCHES FITTED IN THE REGION OF THE MANUALLY OPERATED ACTUATING COMPONENT

The invention relates to an electrical switch with a support unit which bears contact parts, whereby the contact parts are positioned in the area of an activating element which at least partially encloses the support unit. Such types of constructions are known in steering column switches, for example, in which additional activatable contact pairings are positioned within the activating handle itself. In such types of switches, the handle can, for example, be rotatable for the purpose of the activation of the switch (see: DE - AS 23 22 661), but also, however, be displaceable in its longitudinal direction (see, for example, DE-OS 25 31 696).

It is common to such switches that the switches are constructed discretely, within the handle area of the steering column switch, from individual construction elements. Such a type of construction can be disadvantageous if individual parts of the switch have to be changed, or if large manufacturing series are not aimed at with such types of switches, or if different switching sequences are to be aimed at, with a comparable course of movement, with the same mechanical construction.

The invention thus proceeds from an electrical switch of the type resulting from the preamble to patent claim 1. It is the task of the invention to describe a switch which makes it possible it to carry out different switching sequences, with an unchanged construction of the support unit and activating element, and with a comparable activating sequence. Furthermore, defective switches should be easy to repair. The switch in accordance with the invention should, in addition, make it possible for the contact pairs which are contained in it to be operated by means of different activation forms.

This task is solved by means of the combination of characteristics which result from the characterizing portion of patent claim 1.

The invention therefore consists, in principle, of providing the support unit with a mounting for microswitches, which can be operated in a given sequence by means of a prescribed form of movement of the activating element. The advantage of such a measure essentially consists in the fact that the microswitches can be inserted into the prefabricated switches after having been previously tested. It is thereby not necessary for all of the mounting places for a microswitch to actually be occupied. By means of a different development of the form of the activating elements, the microswitches which are inserted into the mounting can, furthermore, be activated in a variant sequence. For purposes of repair, the defectively-working microswitches can be exchanged in a simple manner. This is particularly simple if an easily detachable joining connection, such as a sectional- / plug connector or the like is selected, so that the connecting lines can easily be connected with the newly inserted microswitches.

The activating element must thereby have a contour which, by means of the movement of the activating element, operates the activation push rod of the microswitches in the sequence which is desired.

In order to also achieve a particularly great flexibility here, and to make a rapid retrofitting or retooling of the switch possible, the combination of characteristics in accordance with patent claim 2 is, in a further development of the invention, recommended. A shifting gate, the surface of which is formed relative to the activating push rods of the microswitches, in such a manner that they trigger these in the manner which is desired, is thereby inserted into the activating element. In connection with the placement of the individual switch places in the mounting cavity, a wide variety of switching possibilities and switching sequences results here, while a new switching behavior of the switch is brought about, in accordance with the invention, by exchanging the plate and/or interchanging the microswitches.

Insofar as the activating element encircles the support unit, in the form of a gear shift handle grip unit, in an essentially cylindrical manner, the combination of characteristics in accordance with patent claim 3 is, in a further development of the invention, particularly recommended. The gear shifting gate can thereby be locked into the activating element itself. It can also, however, in a manner corresponding to a combination of the characteristics which are illustrated in the following in connection with patent claim 16, be held by means of a support unit, which can represent, at the same time, a screen for the activating element, as well as an attachment for the switch.

One particularly simple activation of the activating element results from the optional or simultaneous application of the characteristics which are stated in patent claim 4. This means that the switches are triggered through the displacement of the activating elements in the longitudinal axis and/or through the rotation around their axis of rotation in the form prescribed by the development of the gear shifting gate. It has been shown that a large number of switching possibilities is additionally programmable by this means.

It has already been mentioned further above that several microswitches can be locked into the places which are provided in a mounting cavity of the support unit. In order to now be able, by means of a rotational movement, to switch several switches in the sequence which is set by the connecting link, the combination of characteristics in accordance with patent claim 5 is, in a further formation of the invention, to be recommended. By this means, several switches can simultaneously be activated, over a limited rotational path, in the sequence which is set by the connecting link. It is advantageous in this arrangement that a relatively short switching distance results, despite the suitable blocking bevels. In addition, comparatively many switches can be packed next to one another in this activating movement. It is thereby recommended, in a further development of the invention, that the individual microswitches be not directly acted upon by their activating push rods, which are movable in a radial direction, but, rather, indirectly by way of a tipping lever which is attached, in a swivelable manner, to the one end of the toggle switch, and which is supported, on the other end, on the activating push rod. This activating lever can, for example, be formed from sheet metal, within which the inlet bevels are molded so that, in addition to the gear shifting gate, the switching point of the switch can be fixed by means of this lever. The switching tolerance of the switch can, incidentally, be influenced by the elastic activating lever which consists of metal. In addition, the activating force which is necessary for the switch, and the activating distance for the switch, can be enlarged and the tolerance thereby expanded through the selection of the lever.

For the event that a movement in the longitudinal axis for the switching of one or several microswitches is provided for the activating element (among others), the combination of characteristics in accordance with patent claim 6 is, in a further development of the invention, recommended. After that, a (separate) contact part, which is connected, directly or indirectly, with the activating element, is provided. This contact part preferably has a blocking bevel, by means of which it impacts on the corresponding activating push rod of the microswitch. The microswitch can thereby be positioned both longitudinally to the direction of movement, as well as also transversely to the same. The gear shifting gate can thereby combine with the contact part so that, during a rotational movement, the switches which are assigned to the connecting link are triggered and, during a longitudinal movement of the activating element, the microswitch which is assigned to the contact part is triggered. It is also obviously possible to combine the contact part and the gear shifting gate with one another, so that different switches can be triggered in dependence on the direction of movement of the activating element. Both directions of movement can thereby also arise at the same time.

It is now possible to connect the contact part directly with the activating element, for example, by casting it integrally as a single piece, by locking, by fastening with screws, or the like. In this case, in any event, the contact part follows the movement of rotation which is, in many cases, not desired, in which it is desired to trigger the same switch, independently of the rotational position of the activating element, upon the longitudinal displacement of the same. In this case, the combination of characteristics in accordance with patent claim 7 is, in a further development of the invention, recommended. The handle unit can then, for example, not be rotated relative to the activating element, but relative to the carrier unit, so that it therefore remains independent of the rotational position of the activating element relative to the carrier unit in the same position and thereby coordinated with the corresponding microswitch. The said ring unit can then have, for example, a rotating edge, which carries along the activating ring and thereby the contact part of the same.

As has already been stated further above, the invention is outstandingly well suited for packing several microswitches next to one another and transversely to the longitudinal direction of the carrier unit in the first mounting cavity. It can, however, also be recommended, in many cases, to orient the microswitches with their longitudinal direction in the longitudinal direction of the carrier unit. In this case, too, several switches can be positioned next to one another on the carrier unit, such as in a second mounting cavity, for example, so that several microswitches can, in relation to the longitudinal direction of the carrier unit, be located at the same level. The last combination of characteristics noted is particularly suitable in such a case if the switch should, besides the activating element and the additional contact part, be able to be manually activated separately by means of a separate projecting stud. This projecting stud can operate, for example, independently of the contact part and this, in turn, can operate independently of the gear shifting gate (patent claims 8, 9).

In this connection, the combination of characteristics in accordance with patent claim 10, according to which a separately activatable handle unit is present in the form of an activating button, which is positioned in a displaceable manner, concentrically to the position of the activating element in the carrier unit or also in the activating element itself, in the longitudinal direction of the same, is recommended. By means of the longitudinal displacement of the button, the projecting stud then engages with the activating pin of the coordinated microswitch, so that this can be switched independently of the operation of the activating element. The button can be used, for example, for the activating of a motor vehicle horn, which is intended to be able to be activated at any time independently of the connection of other operating devices, such as washing device, wipers, or lights. The corresponding can apply for the operation of warning lights or other devices.

Since a multiplicity of switching positions and, in particular, rotational positions as well, can be adjusted and utilized for the activation of a coordinated switch by means of the activating element, it is recommended, in a further development of the invention, to assign defined locking positions in individual switching positions of the activating elements, within which [locking positions] the activating element remains until a new switching position is selected. In a further development of the invention, the combination of characteristics in accordance with patent claim 11 serves for this purpose. Since, in regard to the activating element, no different positions are provided in its longitudinal direction in which a suitable contour can engage with the activating element itself in a locking manner under prestressing on an opposing contour on the carrier unit, it is recommended to select a locking ring which is positioned in a non-rotatable manner relative to the carrier unit, but displaceable in a longitudinal manner, in order to engage with a coordinated locking curve of the activating element. The locking ring is thereby prestressed in an elastic manner in the direction of locking, whereby the spring is supported, at its other end, on the carrier unit itself or on a fixed point relative to the carrier unit. It is, on the other hand, also possible to guide the locking ring, in a non-rotatable but prestressed manner, in a displaceable manner axially longitudinally within the activating element, and to allow it to act upon a corresponding locking contour of the carrier unit. In both positions, the activating element is guided, upon rotation, into positionally-stable locking positions, by means of which it can only be moved out by means of an expenditure of force during the rotation, whereupon it locks in the next rotational position. During the rotation, the locking ring is consequently pressed, out of the locked position, against the pre-stressing spring, whereby it springs forward yet again as soon as the next locking position of the activating element has been reached.

Upon the activation of the activating element, particularly in connection with its rotational movement, the handling can be simplified through the fact that only one certain rotational area is possible for the activating element. By this means, the switching behavior can be accelerated and all of the switching positions can be adjusted without reshifting. On the other hand, the position of the individual switching positions can also be noted more easily by the operating personnel. In order to achieve this, the combination of characteristics in accordance with patent claim 13 is, in a further development of the invention, recommended. In practical terms, it will thereby be proceeded in such a manner that a spring-mounted stopping catch of the activating element engages in a suitable recess of the carrier unit. The movement of the stopping catch, and thereby of the activating element, is limited relative to the carrier unit through the contour of the recess. This is applicable both for the longitudinal movement of the activating element relative to the carrier unit, as well as relative to the rotational movement of the same. The guide opening which is formed as a recess will suitably have an essentially quadrilateral shape, for example, while a quadrilateral sector is cut out from the cylinder-shaped surface of the carrier unit. In a reverse manner, however, it is conceivable that a projection which serves as a catch unit projects into a corresponding recess of the activating element. The bordered contour must also absolutely not involve the edge of an opening. Spaces bordered by circular edges, which limit the path of a catch unit entering into the surrounding space, can also be provided.

The switch in accordance with the invention is outstandingly well suited for being used, in a motor vehicle, as a steering column switch corresponding to the characteristics in accordance with patent claim 14. The activating element is hereby essentially ring-shaped, so that an extensive freedom exists for the operating personnel in regard to how it manually engages with the activating element. In order to still be able to reset the switch, even after a preliminary mounting of the switch and, in particular, upon a mounting of the carrier unit with the activating element, the combination of characteristics in accordance with patent claim 15 is, in a further development of the invention, recommended. Since, however, the switch and gear shifting gate are, after the assembly, freely accessible here, the combination of characteristics in accordance with patent claim 16 is, in a further development of the invention, recommended. The support unit will thereby simultaneously function as a mounting casing for an area of the activating element in which the carrier unit is again held. In a further development of the invention, the carrier unit can, in addition, be locked with the casing-shaped support unit. The inner casing surface of the support unit can, at the same time, form an abutting unit for the gear shifting gate which is positioned above the switching rod of the microswitches, so that this can not be moved into the direction of switching of the push rod.

One embodiment of the invention will be illustrated in the following by means of the diagram.

A grip casing, which surrounds a carrier unit 2, is to be noted in the diagram as an activating element 1. The carrier unit has a first mounting cavity 3, in which several switching modules, which are configured as microswitches 4, are locked into correspondingly prepared places in the mounting cavity 3. The microswitches 4 are thereby positioned parallel to one another and, in their longitudinal direction, are placed in the mounting cavity transversely to the longitudinal direction of the carrier unit 2. It is now particularly important for the invention that the grip casing 1 is displaceable relative to the carrier unit 2, both in the direction of the longitudinal axis L of the carrier unit, as well as also positioned rotatably around the longitudinal axis L. A catch unit 5 which is connected with the grip casing, which engages with a suitable guide opening 6 on the carrier unit 2, serves to limit the rotational movement. In the present example, the guide opening is formed by circular walls 7, 8. The movement of the catch unit can, however, also be formed by the circular edge of a recess in the carrier unit, or else the edge which limits the movement is the edge of a penetrating opening in a carrier wall.

One other important characteristic of the invention is the application of a gear shifting gate 9, which acts on the push rod 10 of the microswitch 4. The gear shifting gate is essentially a quadrilateral cut-out section from the casing surface of a hollow cylinder, which has suitable projections on its surface which is oriented to the activating push rods 10. The gear shifting gate 9 is detachably connected with the grip casing 1 in a suitable manner, so that it at least follows the rotational movement of the activating element 1. In the present embodiment, in any event, the gear shifting gate 9 is, by means of a projection 13 projecting into a groove 11 in the activating element 1, conducted in a longitudinally displaceable manner and is supported, at the same time, in the longitudinal direction of the grip casing, on a circular recess 12 on the carrier unit 2 in the longitudinal direction of the carrier unit. By this means, the grip casing 1 is longitudinally displaceable relative to the gear shifting gate 9, but carries the gear shifting gate 9 along during a rotational movement. Upon a corresponding development of the connecting link, however, it is also possible to carry this along in the longitudinal direction, as well as in the direction of rotation. It can, within the framework of the invention, also be integrally cast as a single part with the grip casing, but is also, however, advantageously interchangeable, in order to be able to make the switch suitable and adjustable for different purposes of use. The corresponding is applicable to the microswitch 4, in which different switches, as well as only a few switches, can be inserted into the corresponding plugging points of the mounting cavity 3. An additional cavity 14 for the mounting of the microswitches, which are activated with a corresponding gear shifting gate, can also be provided underneath the mounting cavity 3.

In the switch in accordance with the invention, the microswitches 4 which are located within the mounting cavity 3 can not only be activated by means of the gear shifting gate 9, but also by means of a contact part 15 projecting from the grip casing 1 into its internal space. It is possible, therefore, to activate the microswitch 16 of the microswitches 4 which are located in the cavity 3 through the fact that, through the longitudinal movement of the grip casing 1 to the right, the contact part 15 engages with the push rod 17 and presses it downwardly, and thereby activates the microswitch 16. The effects of the gear shifting gate 9 and of the contact part 15 relative to the microswitch 16 can, in the event of need, be combined. As has already been mentioned further above, the position of the gear shifting gate 9 is not affected by the longitudinal movement of the grip casing. A second mounting cavity 20, in which at least one microswitch 21 is positioned coaxially to the longitudinal axis L, is additionally to be noted in the diagram. Several microswitches 21 can, in this position, also be thereby inserted next to one another at corresponding plugging points of the cavity 20. The microswitches 21, or even several of these switches, which can be of different types of switches, if necessary, are activated by means of a switching stud 22 which protrudes out from the lateral wall of the pot-shaped switching knob. The push-button 23 is supported by means of a spring, which is not depicted, on the carrier unit 2 or even on the grip casing 1, so that it is held against a catch unit, which is not depicted in the diagram, in the initial position which is visible from the diagram. The microswitch 21 is then activated by pressing on the push-button 23.

The use of a locking ring 24, which is supported, by means of a flat spiral spring 26, on a locking contour 27 which is incorporated into a ring projection 28 of the carrier unit 2, is additionally important for the invention. The locking ring, which is longitudinally displaceable but rotationally secured relative to the grip casing, is provided with locking projections, not depicted individually here, which are directed in the direction of the annular projection 28, which [projections] are distributed on the circumference of the locking ring and engage with the corresponding recesses of the locking projection 28. The grip casing thereby assumes several predetermined rotational positions, in which the locking ring engages in the locking projection 28 and holds the grip casing 1 in this position for long enough until it is rotated, through the application of force, into the next stable rotational position.

The carrier unit can, for reasons of mounting, be composed of several parts. Thus, for example, one additional support casing 29 is attached to the carrier unit which, as a part of the carrier unit, also has the guide opening 6. The carrier unit can engage with a support unit 30, which can create a connection with the instrument board of a motor vehicle. It is also conceivable, however, for the support unit 30 to encompass both the carrier unit as well as also parts of the grip casing, and for the carrier unit to be locked with the internal surface of the support unit 30. It is evident from the diagram that the spiral spring 26 is, at the same time, also in a position to displace the grip casing 1 in its position relative to the carrier unit 2, and thus consequently fulfills a double task. Individual details which serve for the mounting of the switch in accordance with the invention, such as the attachment of the carrier unit to the casing, suitable sealing units, specifications in regard to the assembly of the switch, etc., should not be discussed individually at this point, but are, in the event of need, available to the average technician. Insofar as the support unit 30 overlaps with the grip casing 1, a penetrating opening, into which the gear shifting gate can be inserted from the outside, can be provided within the grip casing. The gear shifting gate is then supported radially outwardly on the internal wall of the support unit. The change of the microswitches and the change of the connecting link can then also be carried out in the assembled carrier unit / grip casing unit, as long as this unit has not yet been inserted into the support unit, or has not yet been dismounted from the same. It also lies within the framework of the invention if the locking ring is attached to the carrier unit 2 in a non-rotating and longitudinally-displaceable manner, and is supported against a corresponding locking contour on the grip casing 1. The spring 26 can, on the other hand, be supported on the support unit, rather than on the grip casing 1. The contact part 15 can be positioned in such a manner that it does, to be sure, follow the longitudinal direction of the grip casing, but not the rotational movement of the same, however. The contact part 15 could consequently be positioned in a non-rotating, but longitudinally displaceable, manner within the carrier unit, while the carrier unit carries the contact part along during its longitudinal movement. The contact part then represents a part of a switching ring which is carried along by means of a projecting stud in the grip casing. In the present case, the contact part 15 has already attained its switching position relative to the push rod 17.

We claim:
1. An electric switch comprising:
   a carrier having a longitudinal axis and a first mounting cavity;
   an activating element guided on the carrier and at least partially surrounding the carrier;
   at least one microswitch carrying a closable electrical contact inserted into the first mounting cavity, the microswitch having a movable actuator for closing the electrical contact when actuated; and
   a shifting gate carried by the activating element and engagable with the actuator of the microswitch depending upon the movement of the activating element for closing the electrical contact in the microswitch.

2. A switch in accordance with claim 1, wherein at least one element of the group consisting of the microswitches and the shifting gate can be inserted into the carrier or the activating element after the activating element has been mounted on the carrier.

3. A switch in accordance with claim 1, wherein the activating element is essentially shaped as a hollow cylinder and the shifting gate essentially forms a section cut of the mantle surface of this hollow cylinder.

4. A switch in accordance with claim 3, wherein at least one microswitch is activated by a handle unit, which is longitudinally displaceable relative to the carrier but is supported in a non-rotatable manner with a switching stud projecting into the hollow cylinder of the activating elements, in dependence on the longitudinal displacement of the handle unit in the direction of the longitudinal axis of the carrier.

5. A switch in accordance with claim 4, wherein the handle unit is an activating knob which is supported on an end of the carrier and is positioned concentrically to the activating element.

6. A switch in accordance with claim 1, wherein the activating element can rotate relative to the carrier unit around the longitudinal axis of the same and in a displaceable manner along the longitudinal axis.

7. A switch in accordance with claim 1, wherein a plurality of microswitches are positioned next to one another along the longitudinal axis of the carrier.

8. A switch in accordance with claim 1, wherein with the activating element a separate contact part is connected which activates at least one microswitch in dependence on a longitudinal movement of the activating element.

9. A switch in accordance with claim 8, wherein the contact part is a locking ring which is longitudinally displaceable in the carrier and rotatable relative to the activating element, and can be carried along by axial movement of said activating element.

10. A switch in accordance with claim 1, wherein within the first mounting cavity several microswitches are locked into prepared places next to one another and transversely to the longitudinal axis of the carrier, and wherein a second mounting cavity is provided, into which at least one microswitch can be inserted along the longitudinal axis of the carrier.

11. A switch in accordance with claim 10, wherein the microswitch located in the second mounting cavity can be activated by means of switching stud and an additional microswitch independent thereof, by means of the contact part.

12. A switch in accordance with claim 1, wherein for the fixing of rotational positions of the activating element relative to the carrier, the activating element engages, in a manner axially prestressed with the locking contour, into a corresponding counter-contour which is carried by the carrier.

13. A switch in accordance with claim 1, wherein the activating element includes a catch unit positioned in a spring-mounted manner, which engages in a guide aperture in the support unit so that the activating element is held in a non-detachable manner relative to the carrier and a contour of the guide opening serves for the limiting of the movement of the activating element relative to the carrier, both in regard to a rotary movement, and a longitudinal movement.

14. A switch in accordance with claim 1, which is adapted to be attached to a steering column of a motor vehicle, wherein the activating element is an essentially ring-shaped grip handle.

15. A switch in accordance with claim 1, wherein the carrier unit which is connected with the activating element can be locked into a support which can be connected with a steering column or a instrument board of a motor vehicle.

* * * * *